(12) United States Patent
Lee

(10) Patent No.: US 11,627,303 B2
(45) Date of Patent: Apr. 11, 2023

(54) SYSTEM AND METHOD FOR CORRECTED VIDEO-SEE-THROUGH FOR HEAD MOUNTED DISPLAYS

(71) Applicant: INTERAPTIX INC., Toronto (CA)

(72) Inventor: Dae Hyun Lee, Etobicoke (CA)

(73) Assignee: INTERAPTIX INC., Toronto (CA)

( * ) Notice: Subject to any disclaimer, the term of this patent is extended or adjusted under 35 U.S.C. 154(b) by 0 days.

(21) Appl. No.: 16/946,860

(22) Filed: Jul. 9, 2020

(65) Prior Publication Data

US 2021/0014475 A1    Jan. 14, 2021

Related U.S. Application Data

(60) Provisional application No. 62/871,783, filed on Jul. 9, 2019.

(51) Int. Cl.
     *H04N 13/344*      (2018.01)
     *H04N 13/117*      (2018.01)
     *H04N 13/239*      (2018.01)

(52) U.S. Cl.
     CPC ......... *H04N 13/344* (2018.05); *H04N 13/117* (2018.05); *H04N 13/239* (2018.05)

(58) Field of Classification Search
     USPC .......................................................... 348/47
     See application file for complete search history.

(56) References Cited

U.S. PATENT DOCUMENTS

| | | | |
|---|---|---|---|
| 10,437,065 B2* | 10/2019 | Zhu | G02B 27/0172 |
| 2015/0206329 A1* | 7/2015 | Devries | G06F 16/583 |
| | | | 345/633 |
| 2017/0118458 A1* | 4/2017 | Grönholm | H04N 13/243 |
| 2018/0033209 A1* | 2/2018 | Akeley | H04N 13/106 |

\* cited by examiner

*Primary Examiner* — Mikhail Itskovich
(74) *Attorney, Agent, or Firm* — Perry + Currier

(57) ABSTRACT

A head mounted display system with video-see-through (VST) is taught. The system and method process video images captured by at least two forward facing video cameras mounted to the headset to produce generated images whose viewpoints correspond to the viewpoint of the user if the user was not wearing the display system. By generating VST images which have viewpoints corresponding to the user's viewpoint, errors in sizing, distances and positions of objects in the VST images are prevented.

10 Claims, 5 Drawing Sheets

SYSTEM AND METHOD FOR CORRECTED VIDEO-SEE-THROUGH FOR HEAD MOUNTED DISPLAYS

CROSS-REFERENCE TO RELATED APPLICATION

This application claims the benefit of (or priority to) U.S. provisional app. Ser. No. 62/871,783, filed Jul. 9, 2019, which is incorporated herein by reference.

FIELD OF THE INVENTION

The present invention relates to head mounted display devices. More specifically, the present invention relates to a system and method of providing video-see-through for head mounted display devices.

BACKGROUND OF THE INVENTION

Head mounted display devices are known and are used for a variety of purposes. Recently, such devices are being increasingly used for applications such as virtual reality, mixed reality and augmented reality systems. In virtual reality applications, such displays are used to immerse a user in a virtual world by placing display screens in front of the user's eyes, each display screen presenting an appropriate corresponding image of a computer generated stereoscopic view of the virtual world. Such a system can result in a very immersive experience for the user.

While such systems work well, there are a variety of other use cases and applications, such as mixed and/or augmented reality systems, wherein the user needs to see the real world in addition to the virtual world.

For example, a surgical augmented reality system could allow a surgeon to see the patient they are operating on with additional information, such as the patient's vital signs, being displayed within the surgeon's field of view.

Such systems typically require the use of "video-see-through" (VST) head mounted display systems which allow the user to simultaneously view virtual content and the physical world. Conventional VST systems include one or more optical cameras mounted to the exterior of the head mounted display to capture video images of the physical world in front of the user. The captured video images are then appropriately cropped, composited and displayed to the user, along with the virtual images, in the head mounted display, thus providing the user with the required view of virtual and real world images.

However, conventional VST systems suffer from a serious problem in that the viewpoint of the captured video images do not directly correspond to the actual viewpoint of the user. Specifically, the video cameras must be mounted at different physical locations than the pupils of the user's eyes and thus the captured video images which are displayed to the user on the head mounted display do not accurately correspond to the user's pupil position and distance of the user to the observed portion of the real world.

It is desired to have a VST system which provides the user of a head mounted display with a real-world view that corresponds to the viewpoints from the user's pupils.

SUMMARY OF THE INVENTION

It is an object of the present invention to provide a novel system and method for providing video-see-through on a head mounted display which obviates or mitigates at least one disadvantage of the prior art.

According to a first aspect of the present invention, there is provided a head mounted display system comprising: at least one display capable of being worn by a user in front of their eyes and displaying images to the user; at least two video cameras mounted adjacent the at least one display and operable to capture video images from the area in front of the user, the location of the at least two cameras relative to the pupils of the user being known; and a computational device operable to receive the captured video images from each of the at least two cameras and to generate an image from the captured video images for display to the user on the at least one display, the generated image corresponding to the viewpoint at the pupils of the user.

Preferably, the computational device generates an image for each eye of the user, each generated image corresponding to the viewpoint of the respective eye of the user and each generated image is displayed to the respective eye of the user providing the user with a stereoscopic image.

According to another aspect of the present invention, there is provided a method of operating a head mounted display worn by a user in front of their eyes, the head mounted display having at least two video cameras operable to capture video images of the area in front of the user, comprising the steps of: determining the position of the at least two cameras relative to the pupil of each eye of the user; capturing video images of the area in front of the user with each of the at least two video cameras; processing the captured video images to render a generated image representing the area in front of the user from the viewpoint of the eyes of the user; displaying the generated image to the user on the head mounted display.

The present invention provides a system and method for head mounted displays with video-see-through that corresponds to the actual viewpoint of the user.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
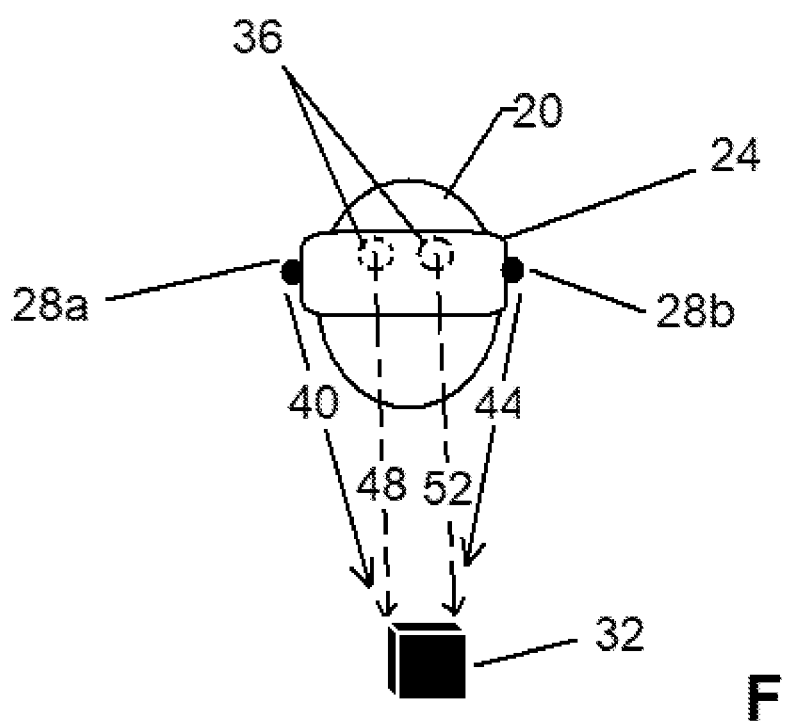
FIG. 1 shows a user and prior art head mounted display with VST.

A user 20 is illustrated in FIG. 1 using a prior art VST-equipped head mounted display system 24. As shown, head mounted display system 24 includes a pair of video cameras 28a, 28b which are located on the exterior vertical edges of head mounted display 24. Video cameras 28a, 28b capture video images of real world objects, such as object 32, and display those images, or portions thereof, to user 20 on head mounted display 24.

However, as illustrated in the figure, the locations of the pupils of eyes 36 of user 20 do not correspond to the location of video cameras 28a, 28b and thus the respective viewpoints of the images acquired by cameras 28a, 28b (indicated by lines 40 and 44) do not correspond to what would be the actual viewpoints (indicated by dashed lines 48 and 52) of the user's eyes 36 if object 32 was viewed without head mounted display 24. Thus, when the images captured by cameras 28a, 28b are displayed to user 20 in head mounted display 24, object 32 appears closer to user 20 and/or larger than it actually is. In many applications, such as the above-mentioned surgical case, such distortions cannot be tolerated.

Figure 2:
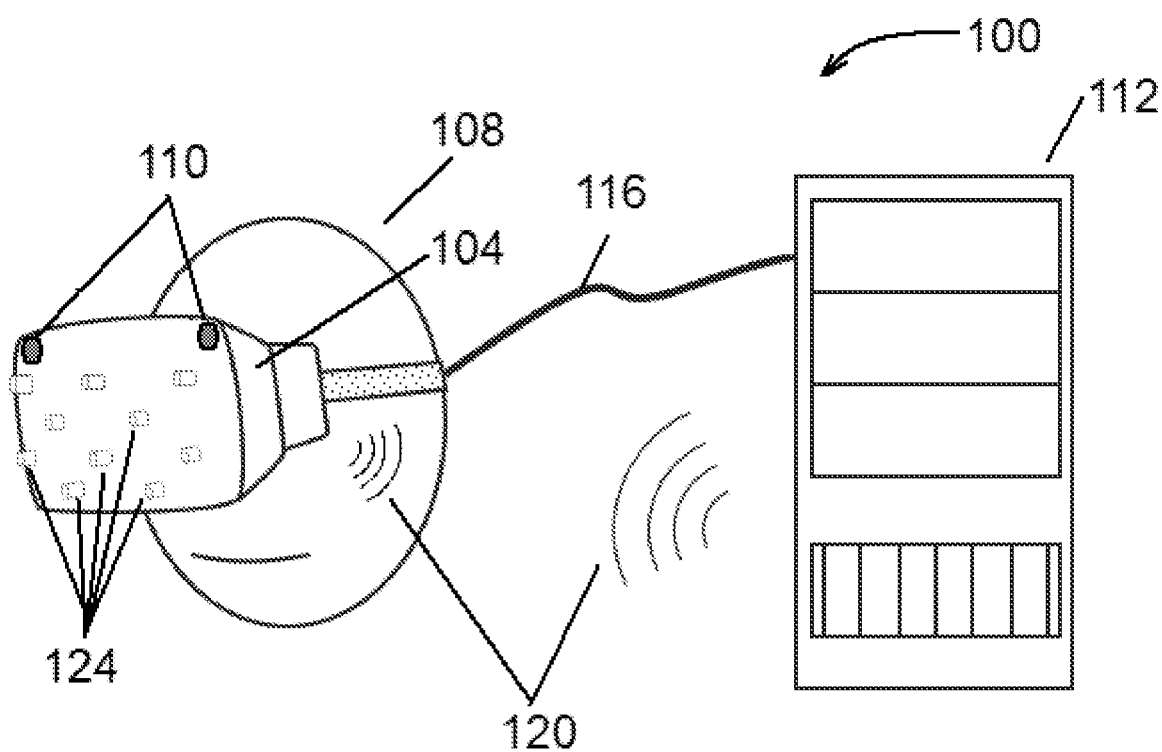
FIG. 2 shows a head mounted VST system in accordance with the present invention.

In FIG. 2, a video-see-through head mounted display system in accordance with an aspect of the present invention is indicated generally at 100. System 100 includes a head mounted display unit 104, which can be worn by a user 108, and a computation device 112. Head mounted display unit 104 can be a commercially available headset, such as an Oculus Rift VR headset or others, or can be a custom headset.

Unit 104 includes a display, or displays, (not shown in this figure) which are operable to display a different video image to each of the eyes of user 108 and unit 104 can also include head tracking and orientation measuring systems which can be used to determine the position and orientation of the head (and thus the eyes) of user 108. Unit 104 can also include depth sensors 110, such as a RealSense Depth Camera D435, manufactured by Intel, a LIDAR scanner, or any other suitable system which can determine the distance between unit 104 and objects in front of unit 104.

Computation device 112 can be a conventional computing device, such as a personal computer, single board computer, etc. or can be a purpose-built computing device which provides the necessary computational processing, as described below.

Computation device 112 can be located within unit 104 or can be separate from unit 104 and, in the latter case, computational device 112 can be connected to unit 104 via a wired tether 116 or via a wireless data connection 120.

Unit 104 also includes at least two video cameras 124 which are mounted to unit 104 and which face generally forward, with respect to the viewpoint of user 108, when user 108 is wearing unit 104. It is contemplated that, in a minimal viable product configuration, cameras 124 can be (or can include) the above-mentioned depth sensors 110, provided that sensors 110 are visible light cameras and allow access to their captured images for subsequent image processing by computation device 112.

In the case where unit 104 is a custom headset, cameras 124 are mounted to the front of the headset and appropriately communicate with computation device 112. In the case where unit 104 is a commercially available headset, cameras 124 can be provided on a module which is designed to be attached to the commercially available headset with cameras 124 facing outward from unit 104 and the module can appropriately communicate with computation device 112.

Preferably, cameras 124 are mounted such that there are no "blindspots", relative to the expected field of view of a user wearing unit 104, and that all areas of the user's field of view are captured by cameras 124. While not essential, it is preferred that the total combined field of view coverage of cameras 124 is at least one-hundred and eighty degrees, both horizontally and vertically.

Preferably, several cameras 124 (e.g.—eight or more) are provided, each of which is a color camera with a relatively narrow field of view (FOV), and cameras 124 are placed close to each other on the front face unit 104. Such a configuration is advantageous as simplifies the image processing required to produce a generated view (as described below) and it allows relatively low resolution (and hence low expense) cameras to be employed while still providing an overall sufficient quality of a generated view.

As should be apparent to those of skill in the art, it is not necessary that all cameras 124 have the same resolution, FOV or even that all cameras be color cameras, as the preferred processing methods of the present invention can compensate for such differences.

The locations of cameras 124 on unit 104, and inter-camera distances and the FOV of cameras 124 and their positioning relative to the displays in unit 104, are determined at the time of manufacture (in the case of a custom headset) or the at time of manufacture and installation of the camera module (in the case of a module to be attached to a commercial headset) and this information is provided to computation device 112 as an input for the image processing described below which is performed by computational device 112.

Figure 3:
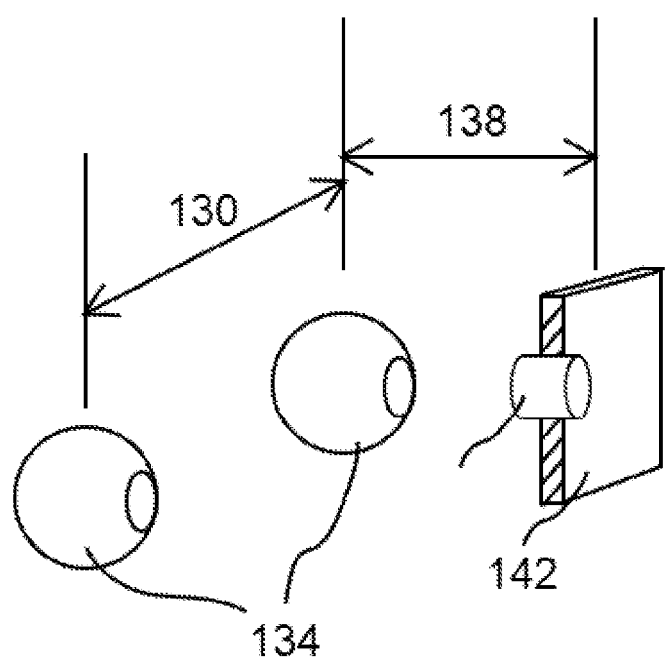
FIG. 3 shows some of the physical parameters required by the system of FIG. 2.

Additional inputs to computational device 112 include the distance 130 between the pupils of the eyes 134 of the user 108, as shown in FIG. 3, and the distance 138 from eyes 134 to the display, or displays, 142 of unit 104. Distance 130 can be manually determined, for example by user 108 holding a ruler under their eyes 134 while looking into a mirror before donning headset 104, or can be determined by cameras (not shown) inside unit 104 which can image eyes 134 and determine the distance between the pupils or via any other suitable means as will occur to those of skill in the art.

Similarly, distance 138 can be determined by any suitable means, such as by a time of flight sensor 146 in unit 104 or from any focus adjustments made by user 108 that are required to adjust an optical path to bring images on display 142 into focus, etc.

As will now be apparent to those of skill in the art, with these physical parameters, system 100 can determine the location of each camera 124 relative to each pupil of user 108.

Figure 4:
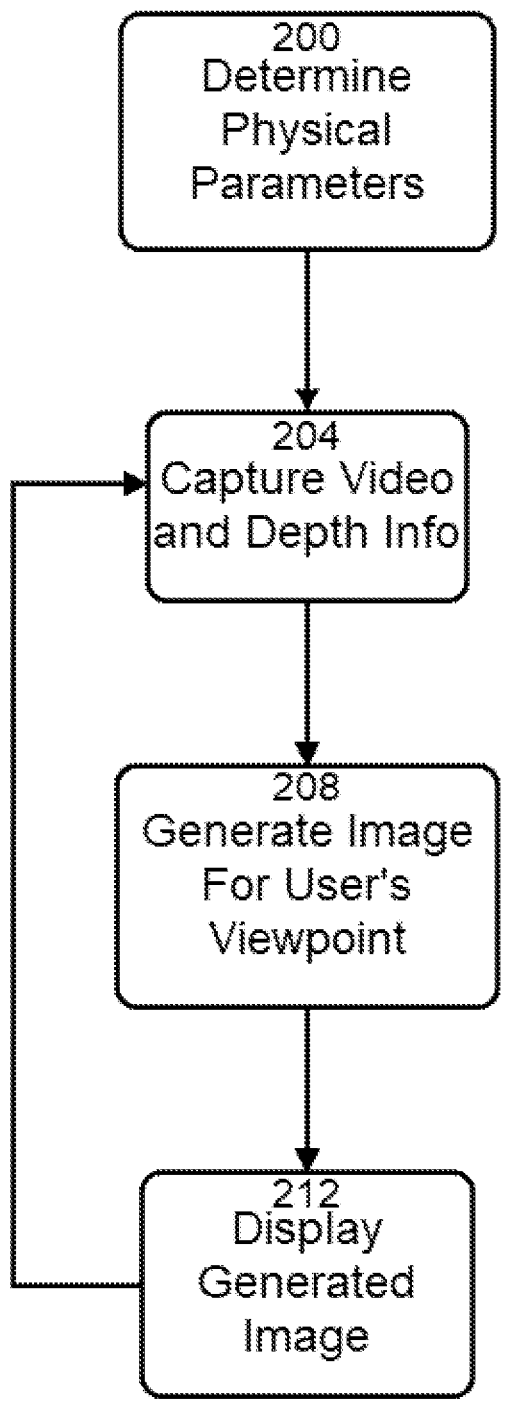
FIG. 4 shows a flowchart of a method in accordance with the present invention.
Figure 5:
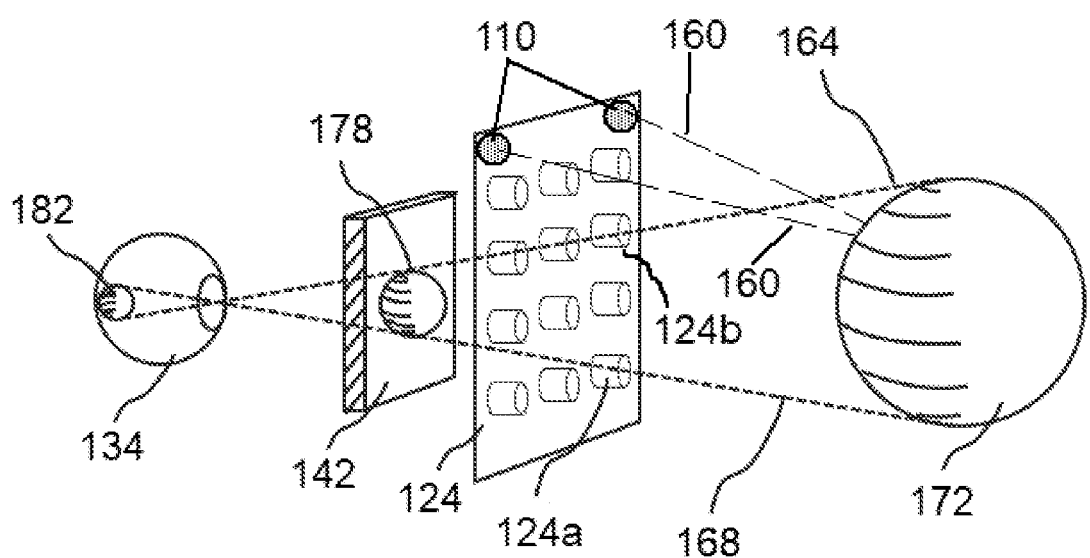
FIG. 5 shows the creation of a generated view image by the system of FIG. 2 corresponding to the viewpoint on a user.

A method in accordance with an aspect of the present invention, will now be described, with reference to FIGS. 4 and 5.

The method commences at step 200 wherein the physical parameters of unit 104 and user 108 are determined and provided to computational device 112. As mentioned above, these physical parameters include the number of cameras 124 on unit 104, as well as their locations relative to the display 142 in unit 104. It is contemplated that, in most cases, this information will be a constant, fixed at the time of manufacture and/or assembly of unit 104 and provided once to computational unit 112. However, it is also contemplated that different units 104 may be used with computational device 112 and in such cases; these different units 104 may have different physical parameters which can be provided to computational device 112 when these units 104 are connected thereto.

The inter-pupil distance 130 and eye to display 142 distance 138 are also determined and provided to computational unit 112 such that computational unit 112 can determine the location, distance and FOV of each camera 124 with respect to each of the pupils of user 108.

At step 204, cameras 124 are activated and begin capturing video from their respective FOVs and provide that captured video to computational device 112. Also, depth information 160, from depth sensors 110 if present, is captured and is also provided to computational device 112.

In a current embodiment of the present invention, computation device 112 employs the technique of light field rendering to process video captured by cameras 124. Specifically, the lightfield rendering is employed to create a generated view from the video captured by cameras 124 which is correct for the viewpoint of user 108 looking at display 142. While light field rendering is discussed herein, the present invention is not so limited and other suitable techniques for processing video captured by cameras, such as view interpolation methods, will occur to those of skill in the art and can be used.

At step 208, computational device 112 uses the depth information and the video captured by cameras 124 to produce a generated view of the real world in front of user 108, the generated view corresponding to the viewpoint of the user as would be viewed by the user if they were not wearing unit 104.

Specifically, computational device 112 uses the depth information 160 with the light field rendering technique to estimate the specific cameras 124a, 124b, etc. which will capture light rays 164, 168 that would reach the pupils of the eyes of user 108 from each object 172 in front of user 108, if user 108 was observing the real world directly, without unit 104. The video captured by these cameras 124 is then processed by computational unit 112 to produce a generated image 178 which is viewed 182 by user 108.

At step 212 the generated view is displayed to user 108 on display 142 and the process returns to step 204. Preferably, computational device 112 has sufficient processing capacity to render generated view 178 at a frame rate of at least 30 FPS and more preferably, at a frame rate greater than 60 FPS.

While the method described above provides advantages over the prior art in that the field of view of the generated image of real world that Is provided to the user corresponds to the viewpoint the user would have if they were not wearing unit 104, preferably computational device 112 produces two generated images, one for each eye 134 of user 108 to provide a stereoscopic view for user 108. In this case, each generated image will correspond to the viewpoint of the eye 134 of user 108 for which it is generated and such stereoscopic images provide a more useful result in many cases. Thus, for such cases, steps 200 to 212 are repeated for each eye 134 of user 208.

It is contemplated that, in some embodiments, depth sensors 110 may be omitted and the necessary depth information for computational device 112 can be determined directly from the video images captures by cameras 124 using known image processing techniques.

If it is desired, generated images 178 can be stored, in addition to being displayed to user 108, and in such a case generated images can be store on computational device 112 or on a separate storage device (not shown).

While the above-described aspects of the present invention provide a user of a head mounted display system with a viewpoint-correct view of the real world, it is also contemplated that in some circumstances it may be desired to provide the user with real world view that corresponds to a different viewpoint. Specifically, it is contemplated that computational device 112 can be provided with a selected location, a "virtual viewpoint", for the pupils of the eyes of the user. Specifically, computational device 112 can be provided with a location for the pupils of the user which does not, in fact, correspond to the actual location of the pupils.

For example, computational device 112 can be instructed that the location of the pupils of the user are one foot further apart (distance 130 is one foot longer) than they actually are. In such a case the generated views produced by computational device 112 would appear enlarged, or magnified, to the actual real-world view which would otherwise be experienced by the user if they were not wearing unit 104. Similarly, a virtual viewpoint defining the pupils of user 108 as being located to one side or the other of user 108 or above or below user 108 could be employed if desired.

As will now be apparent, the present invention provides a head mounted display system with video-see-through images that correspond to the user's viewpoint. Thus, distortions in distance, position and size which would occur without the present invention are avoided.

The above-described embodiments of the invention are intended to be examples of the present invention and alterations and modifications may be effected thereto, by those of skill in the art, without departing from the scope of the invention which is defined solely by the claims appended hereto.

I claim:

1. A head mounted display system comprising:
at least one display capable of being worn by a user in front of their eyes and displaying images to the user, wherein the user's eyes have an inter-pupil distance;
at least two video cameras mounted adjacent the at least one display and having fixed locations relative to pupils of the eyes of the user when the head mounted display system is worn by the user, the at least two video cameras operable to capture video images from a field of view in front of the user;
a depth sensor mounted to said display, the depth sensor to detect distances between the display and objects located in the field of view of the user; and
a computational device operable to:
determine based on the inter-pupil distance, the fixed locations of the at least two video cameras, and the distances detected by the depth sensor, a transformation to transform each of the at least two video cameras to locations of the pupils of the user:
receive the captured video images from each of the at least two cameras;
apply the transformation to the captured video images to generate an image from the captured video images for display to the user on the at least one display, the generated image corresponding to the viewpoint at the pupils of the user, including displaying the objects located in the field of view of the user at depths corresponding to distances of the objects from pupils of the user, the depths computed based on the distances detected by the depth sensor and the fixed locations of the at least two video cameras relative to the locations of the pupils of the user.

2. The head mounted display system according to claim 1 wherein the depth sensor comprises the at least two video cameras and detects the distances between the at least one display and the objects located in the field of view of the user from the captured video images.

3. The head mounted display system according to claim 1 wherein the computational device generates an image for each eye of the user, each generated image corresponding to the viewpoint of the respective eye of the user and each generated image is displayed to the respective eye of the user providing the user with a stereoscopic image.

4. The head mounted display system according to claim 1 wherein the computational device is mounted to the at least one display.

5. The head mounted display system according to claim 1 wherein the computational device is connected to the at least one display by a wire tether.

6. The head mounted display system according to claim 1 wherein the computational device is wirelessly connected to the at least one display.

7. The head mounted display system of claim 1 wherein the locations of pupils of the user are virtual locations, selected by the user.

8. A method of operating a head mounted display worn by a user in front of their eyes, the head mounted display having at least two video cameras operable to capture video images of a field of view in front of the user, comprising the steps of:

obtaining an inter-pupil distance of the eyes of the user;

detecting distances between the display and objects located in the field of view of the user:

determining, based on the inter-pupil distance, a fixed location of each of the at least two cameras relative to the pupil of each eye of the user, and the detected distances, a transformation to transform each of the at least two video cameras to locations of the pupils of the user;

capturing video images of the field of view in front of the user with each of the at least two video cameras;

applying the transformation to the captured video images to render a generated image representing the field of view in front of the user from the viewpoint of the eyes of the user, wherein the generated image displays the objects located in the field of view of the user at depths corresponding to distances of the objects from pupils of the user, the depths computed based on the distances detected by the depth sensor and the fixed locations of the at least two video cameras relative to the locations of the pupils of the user;

displaying the generated image to the user on the head mounted display.

9. The method of claim 8 wherein the captured video images are processed to detect the distances between the display and the objects located in the field of view.

10. The method of claim 8 wherein the captured video images are processed to render a respective generated image for each eye of the user, each respective generated image corresponding to the viewpoint of the respective eye of the user.

* * * * *